United States Patent

Buckley et al.

[11] 4,028,815
[45] June 14, 1977

[54] TEMPERATURE COMPENSATED TOROIDAL ACCELEROMETER

[75] Inventors: Charles G. Buckley, Phoenix, Ariz.; Ghanshyam A. Bhat, Matawan, N.J.; Harold L. Swartz, Glendale, Ariz.

[73] Assignee: Sperry Rand Corporation, New York, N.Y.

[22] Filed: Nov. 18, 1974

[21] Appl. No.: 524,594

[52] U.S. Cl. .............................. 33/366; 73/516 LM
[51] Int. Cl.² ........................................ G01C 9/06
[58] Field of Search ............... 33/366; 338/43, 44, 338/80, 81; 324/65; 73/516 R, 516 LM, 517 R

[56] References Cited

UNITED STATES PATENTS

| | | |
|---|---|---|
| 2,978,638 | 4/1961 | Wing et al. .................. 73/517 R X |
| 3,171,213 | 3/1965 | Swarts et al. ........................ 33/366 |
| 3,442,023 | 5/1969 | Remington et al. ................. 33/366 |

*Primary Examiner*—Charles E. Phillips
*Attorney, Agent, or Firm*—Howard P. Terry; Thomas J. Scott

[57] ABSTRACT

A toroidal accelerometer including a toroidal shaped housing having first and second oppositely disposed arcuate shaped electrodes and a third electrode which is a common electrode, all three electrodes being partially immersed in an electrolytic fluid and subject to differential wetting in accordance with the angle of tilt about a horizontal axis of rotation or axis of symmetry of the toroid. A fourth electrode positioned between the first and second electrodes, equi-distant from the third electrode is at all times completely immersed in the electrolytic fluid. Each of the first, second and fourth electrodes in combination with the third electrode define a conductance cell in which each electrode is coupled to an electronic circuit for providing a measurable electrical output signal in accordance with the angular tilt of the housing about the horizontal axis therethrough in which the output signal is temperature compensated in the electronic circuit by the variation in impedance of the conductance cell defined by the third and fourth electrodes.

13 Claims, 11 Drawing Figures

PRIOR ART

TEMPERATURE COMPENSATED TOROIDAL ACCELEROMETER

BACKGROUND OF THE INVENTION

1. Field of the Invention

The invention pertains to the art of toroidal shaped electrolytic accelerometers or tilt sensors and more particularly to devices of this type which include means for providing temperature compensation.

2. Description of the Prior Art

The subject invention is an improvement over the following U.S. Pat. Nos.: 3,823,486 entitled "Toroidal Electrolytic Sensor and Method of Manufacture", issued in the name of Bhat et al on July 16, 1974; 3,604,275, issued in the name of T. S. Fox et al on Sept. 14, 1971 and entitled "Toroidal Electrolytic Sensor"; and 3,171,213, entitled "Electrolytic Tilt Sensor", issued in the name of R. E. Swarts et al on Mar. 2, 1965, all of said patents being assigned to the assignee of the subject application.

U.S. Pat. No. 3,171,213 discloses a device comprised of a housing having a toroidal shaped chamber formed by a cylindrical housing having an inner tube disposed along the axis of tilt of the housing. The inner tube includes an insulative rod disposed within an outer conductive portion which forms a common terminal. Affixed to the interior surface of the housing are two arcuate shaped terminals or conductors arranged in opposed angular relation with respect to one another at a fixed radial spacing with respect to the longitudinal tube. An electrolytic liquid half fills the toroidal shaped inner chamber of the sensor. This device is designed and constructed so that its operation is characterized by a fundamental physical relationship between the angle of tilt and the areas of the electrodes immersed in the electrolytic solution. The principal of operation states that the difference in immersed areas between the respective arcuately disposed inner conductive terminals is linearly proportional to the angle of tilt. This is expressed mathematically as follows:

$$(A_L - A_R) = K\theta \quad (1)$$

where:

$A_L$ = immersed area of the electrode in the left conductance cell.

$A_R$ = immersed area of the electrode in the right conductance cell.

$K$ = a proportionality constant relating to the geometry of the electrodes expressed in degrees per unit area.

$\theta$ = angle of tilt.

It is apparent from the foregoing equation that if an increment of electrode area is added to or subtracted from both conductance cells, the equality of the equation is maintained. This implies that the operation of the device is inherently insensitive to electrolytic fluid level change. Variations in fluid level may result from different effects including leakage of the fluid from the sensor which will lower the level of the fluid, hangup of the fluid within the sensor which will have the same effect, gas bubble entrapment within the fluid which will increase the fluid level in the sensor and effects resulting from the temperature expansion characteristic of the housing and the fluid. It will be noted that the device described by equation (1) is insensitive to the fluid level changes resulting from thermal expansion properties of the fluid in the housing because these changes will not effect the equality of the equation.

However, the practical implementation of the device described in U.S. Pat. No. 3,171,213, in accordance with equation (1) requires an electrical circuit means whereby a measurable voltage can be developed which is proportional to the left hand side of the equation. The circuit must provide a proportional functional relationship between the measurable voltage and the tilt angle of the device represented by the right hand side of the equation. The resistance value of the two conductance cells is the parameter commonly used to represent the immersed area. The resistance versus area relationship to be used is described in the following equation:

$$R = \frac{D\delta}{A} \quad (2)$$

where $D$ = distance between electrodes in the conductance cell.

$\delta$ = resistivity of the electrolytic solution expressed as ohms per unit area per unit distance.

$A$ = immersed area of an electrode.

Solving the foregoing equation for A and substituting the resulting relationship into equation (1) with appropriate subscripts, the following equation results:

$$(1/R_L - 1/R_R) D\delta = K\theta \quad (3)$$

This equation is the characteristic equation of toroidal accelerometers and tilt sensors known in the prior art. A circuit which will permit a voltage to be measured which is proportional to the quantity $(1/R_L - 1/R_R)$ or functionally related to this quantity so that a voltage and angle can be equated is shown in FIG. 1. It will be shown in the following analysis that the toroidal accelerometer known in the prior art and the electrical circuit used in connection therewith does not result in a sensor which is insensitive to the effects of temperature.

A circit typically used with the electrolytic tilt sensor disclosed by R. E. Swarts et al is shown in FIG. 1. The voltage across the output resistor R is expressed as follows:

$$V = I_T(R) \quad 4$$

$$I_T = I_L + I_R \quad 5$$

$$I_L = (E - V/R_L) \quad 6$$

$$I_R = (-E - V/R_R) \quad 7$$

Substituting equations (6) and (7) into equation (5) and substituting the result thereof into equation (4) yields:

$$V = R\left[\left(\frac{E-V}{R_L}\right) + \left(\frac{-E-V}{R_R}\right)\right] \quad (8)$$

First transposing terms to obtain:

$$\left(\frac{1}{R_L} - \frac{1}{R_R}\right) = \frac{V}{E}\left(\frac{1}{R} + \frac{1}{R_L} + \frac{1}{R_R}\right) \quad (9)$$

Then substituting this equation into equation (3) yields:

$$\left(\frac{1}{R} + \frac{1}{R_L} + \frac{1}{R_R}\right)\frac{V}{E} D\delta = K\Theta \qquad (10)$$

Using the area relationship for resistance of the cells, in equation (2) and solving for the voltage results in the following equation:

$$V = \frac{KE\Theta}{\frac{D\delta}{R} + (A_L + A_R)} \qquad (11)$$

An inspection of the foregoing equation shows there are two quantities in the equation which vary with temperature, i.e., the electrolytic resistivity ($\delta$) and the quantity ($A_L + A_R$).

The electrolytic resistivity ($\delta$) typically decreases with increasing temperature and the quantity ($A_L + A_R$) which represents the total immersed areas of the electrodes is temperature sensitive due to fluid expansion and contraction. In practice, the fluid has a greater volumetric thermal expansion than the housing material used to contain it. As a result, the fluid level in the toroidal shaped cavity will rise with increasing temperature. Therefore, it is apparent that the value of the load resistor (R) may be selected in order to maintain the most constant value of the denominator in the above equation over a given range of temperature. Thus, the circuit shown in FIG. 1 provides a means of limited temperature compensation for the toroidal accelerometer or tilt sensor device as known to the prior art.

In U.S. Pat. No. 3,604,275 the toroidal electrolytic sensor included a hollow tubular member of glass having disposed therein substantially identical arcuate-shaped pairs of electrodes diametrically positioned within the member. This sensor was stated as enjoying inherent temperature compensation due to its symmetrical configuration. Expansion and contraction of the electrolyte occurred symmetrically with respect to both pairs of electrodes and therefore the null electrical characteristics remained virtually constant and verticality drift due to temperature changes from the calibration temperature were minimized.

In U.S. Pat. No. 3,823,486 it was noted that the improved structural characteristics of the sensor eliminated the requirement of extra fluid to fill up the lower portions of the device as required in the accelerometer disclosed by Fox et al. As a result, the device disclosed by Bhat et al was less susceptible to temperature variations for a given linear angular range of the device. Although the configuration disclosed by Bhat et al is less susceptible to temperature variations, neither this device nor the prior art devices of Fox et al or Swarts et al included means which effectively compensated the effects due to temperature produced on the two quantities in the foregoing equation, i.e., electrolyte resistivity ($\delta$) and the quantity ($A_L + A_R$) which represents the total immersed areas of the electrodes.

There are, however, electrical circuits known in the prior art which employ an operational amplifier and provide a voltage (V) which is linearly related to the quantity ($l/R_L - l/R_R$) in the characteristic equation of the device expressed in equation (3). One such typical circuit is disclosed on page 210, FIGS. 6, 8 of "Operational Amplifiers — Design and Applications" by Graeme, Tobey and Huelsman, published 1971 by McGraw Hill Book Compay. A similar type circuit is shown in U.S. Pat. No. 2,978,638 entitled "Coercion-Free Capacitance Pick-off", issued Apr. 4, 1961 and assigned to the present assignee. This typical prior art circuit is shown in FIG. 3 and it includes an operational amplifier which provides an output voltage V mathematically expressed as:

$$V = ER \, (l/R_L - l/R_R) \qquad (12)$$

Solving for the expression ($l/R_L - l/R_R$) and substituting the result into equation (3) above yields the following relationship for the voltage V:

$$V = \frac{ERK\Theta}{D\delta} \qquad (13)$$

It is seen from the foregoing equation that all terms in the coefficient of $\Theta$ on the right side of the equation are basically insensitive to temperature with the exception of the electrolytic resistivity ($\delta$). Since this term is contained in the characteristic equation for this type of sensor as described by equation (3) it can be expected to appear in some form or other in the voltage versus tilt angle function derived from any electrical circuit used to provide the output voltage V in accordance with equation (3).

The subject invention provides means in this type of sensor which in combination with a suitable electronic circuit compensates for variations in output voltage produced by the effect of temperature on the electrolyte resistivity ($\delta$).

SUMMARY OF THE INVENTION

The subject invention is a toroidal accelerometer or electrolytic tilt sensor including at least two oppositely disposed arcuate shaped conductive electrodes and a common electrode which are partially immersed in an electrolytic fluid within a toroidal shaped housing. A fourth electrode referred to as an auxiliary electrode, is also disposed within the toroidal shaped housing and is completely immersed in the electrolytic fluid.

An electronic circuit including a transformer coupled a.c. source or equivalent has the end terminals on the secondary winding coupled to the respective arcuate shaped partially immersed electrodes and the center-tap terminal connected to ground. The common electrode is coupled to the negative input terminal of an operational amplifier which has its output terminal coupled through the auxiliary electrode within the toroidal shaped housing back to its negative input terminal in feedback fashion and the positive input terminal on the operational amplifier is connected to ground.

The output signal produced by the operational amplifier in response to the voltage applied at the negative input terminal is proportional to the angle of tilt about a longitudinal axis through the toroidal accelerometer. The auxiliary electrode coupled between the output of the operational amplifier and its negative input terminal functions as a variable impedance having a value which is proportional to the variations in the resistivity ($\delta$) of the electrolytic fluid between the auxiliary electrode and the common electrode. Since these variations in the resistivity will be determined primarily by changes due to temperature, the variable impedance will provide a feedback signal to the negative input terminal of the operational amplifier which will compensate the input signal applied thereto for the effect of temperature on the electrolyte resistivity.

DESCRIPTION OF THE PREFERRED EMBODIMENT

Referring to the relationship for the voltage V set forth in the Description of the Prior Art:

$$V = \frac{ERK\theta}{D\delta} \quad (13)$$

Figure 2:
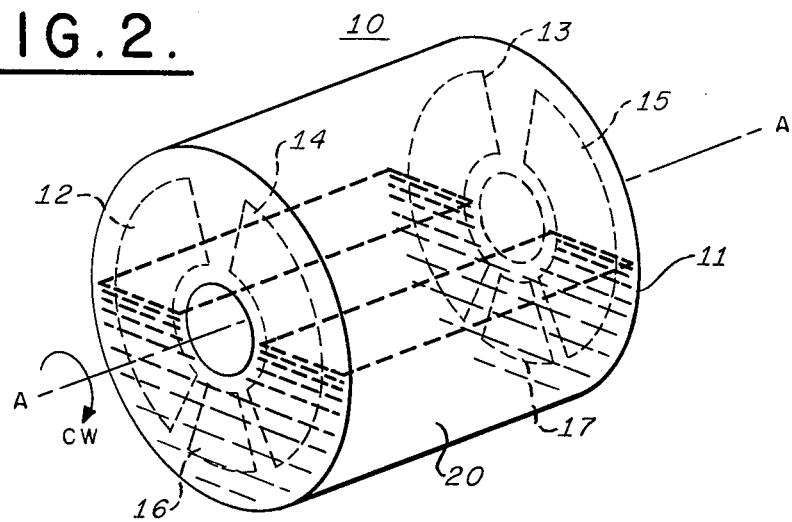
FIG. 2 is an isometric representation of a toroidal accelerometer embodying the invention including two pairs of oppositely disposed arcuately shaped electrodes partially immersed in an electrolytic fluid and a third pair of electrodes totally immersed in the electrolytic fluid.

It was observed from this equation that all the terms in the coefficient of $\theta$ on the right side of the equation were insensitive to temperature with the exception of the electrolytic resistivity ($\delta$). The basis of the improved toroidal accelerometer is the recognition that the characteristic relationship for the voltage V set forth in equation (13) contains a term ($\delta$) for the electrolytic resistivity which can be replaced in equation (13) by a measurable impedance quantity. This is accomplished as shown in FIG. 2 by constructing a third condutance cell composed of a pair of oppositely facing conductive electrodes referred to as the auxiliary electrodes 16, 17 which are always fully immersed in the electrolytic fluid 20. The measurable impedance quantity that is developed between these electrodes is linearly related to the electrolyte resistivity term ($\delta$). The impedance of this auxiliary cell may be expressed in accordance with equation (2) with appropriate subscript notation as:

$$R_A = \frac{D_A \delta}{A_A} \quad (14)$$

Solving this equation for the electrolyte resistivity term ($\delta$) produces the following equation:

$$\delta = \frac{R_A A_A}{D_A} \quad (15)$$

Since the auxiliary conductance cell represented by electrodes 16 and 16 shares the same electrolytic fluid 20 as the left conductance cell 12 and 13 and the right conductance cell 14 and 15, the resistivity of the solution in each cell is substantially equal and equation (15) can be substituted into equaton (3) to develop a new characteristic equation which will define the improved toroidal accelerometer described herein:

$$(1/R_L - 1/R_R) R_A (DA_A/D_A) = K\theta \quad (16)$$

Since the terms $D$, $D_A$, $A_A$ and $K$ are all constants related to construction geometry and are insensitive to temperature effects, they can all be combined into a single coefficient K in order to simplify equation (16) to produce the following equation:

$$(1/R_L - 1/R_R) R_A = K\theta \quad (17)$$

The foregoing equation (17) is the new characteristic equation of the improved toroidal accelerometer including temperature compensation as disclosed herein.

Figure 1:
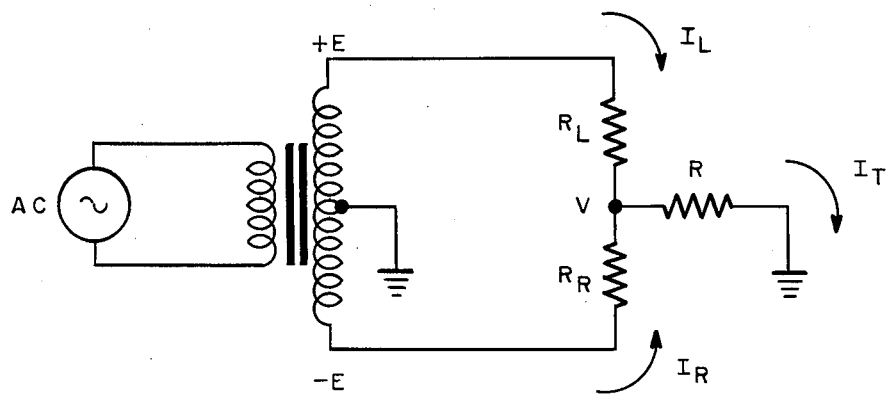
FIG. 1 is a schematic diagram of a typical electronic circuit which has been used with prior art toroidal accelerometers and tilt sensors.
Figure 3:
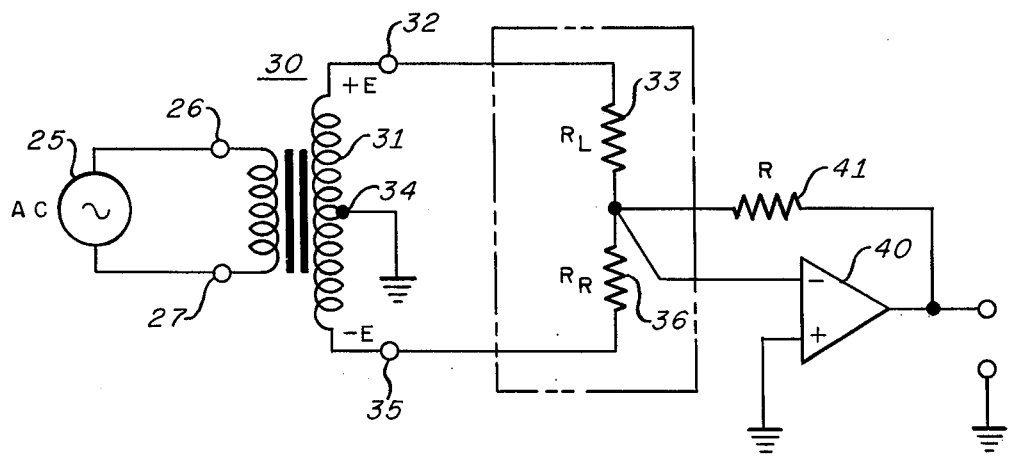
FIG. 3 is a schematic diagram of a typical prior art electronic circuit useful in understanding the toroidal accelerometer of the present invention.

The improved toroidal accelerometer when used with an appropriate electronic circuit such as the prior art circuit shown in FIG. 3 wherein the fixed value resistor R is replaced by the equivalent impedance $R_A$ will provide a measurable output voltage signal which is proportional to the left hand side of the characteristic equation thereby allowing the output voltage and the tilt angle to be equated. The resultant relationship defined in equation (17) will contain no temperature sensitive parameters.

Any circuit which establishes a single voltage or a voltage function according to the following equation represents a suitable implementation of the improved toroidal accelerometer:

Voltage or voltage function $$= (1/R_L - 1/R_R) R_A C \quad (18)$$

Where C is a proportionality constant.

A preferred embodiment of an improved toroidal accelerometer will be described with reference to FIG. 2 which shows a toroidal accelerometer or tilt sensor 10 comprised of a housing 11 arranged to be angularly displaced about an axis of tilt A—A. A first pair of arcuately shaped electrodes 12, 13 are mounted within the housing 11 and affixed to the front and rear surfaces threof respectively. A second pair of arcuately shaped electrodes 14, 15 are disposed opposite said first pair of electrodes and mounted on the front and rear surfaces within the housing 11 respectively. A third pair of electrodes, 16, 17 are affixed to the front and rear surfaces within the housing 11 respectively between the lower extremities of the corresponding electrodes from the aforementioned first and second pairs of electrodes. An electrolytic fluiid 20 partialy fills the toroidal shaped chamber within the housing 11 partially immersing the electrodes from the first and second pairs of electrodes and totally immersing both electrodes 17 and 16 of the third pair of electrodes.

As set forth in mathematical terms above, a signal provided by the third pair of electrodes will provide a means which compensates for temperature variations in the output signal produced by the toroidal accelerometer 10 as a result of the effect of temperature on the electrolytic resistivity ($\delta$) of the fluid 20.

The housing 11 may be made of any suitable non-conductive material such as glass, ceramic or other vitreous material. In one toroidal accelerometer incorporating the invention the non-conductive material used for the housing 11 was Mycalex 620BB manufactured by Mycalex, Division of Spaulding Fibre Company, Clifton, New Jersey. Mycalex 620BB is a precision-moulded grade of ceramoplastic with a large portion of synthetic mica precipitated out of a glass binder. This material provides high temperature endurance, high distortion temperature and high strength. Some of the properties of this material are:

Heat distortion temperature — 593° C
Maximum temperature endurance — 648° C
Thermal expansion coefficient — $9.4 \times 10^{-6}$ inches per inch-degree C
Thermal conductivity — .29 BTU/hour foot degree F
Tensile strength — 5000 psi
Compressive strength — 30,000 psi
Flexural strength — 12,000 psi
Modulus of elasticity — $12 \times 10^6$ psi. The electrodes 12–17 may be comprised of platinum, silver or other suitable conductive material deposited, for example, by sputtering along the interior surfaces of the front and rear faces within the housing 11. In order to provide a relatively large range of angular displacement — typically $\pm 20°$ of tilt or more — the electrodes 12–15 must have sufficient arcuate length to provide this range of angle. In an actually constructed embodiment of the subject invention each of the electrodes 13 and 15 had an arcuate length of approximately 130° and each electrode was immersed along approximately 60° of its arcuate length when the axis of tilt was substantially zero degrees.

The third pair of electrodes 16, 17 is designed to have sufficient area so that the resistivity of the solution between the electrodes 16, 17 in the third pair is substantially equal to the resistivity of the solution between the electrodes 12, 13 and 14, 15 respectively in the first and second pairs of electrodes when the angle of tilt is substantially zero degrees. In the actually constructed embodiment of the subject invention the arcuate length of the electrode 16 was approximately 60°.

Since the electrodes 13, 15 and 17 are connected together to form a common electrical junction as will be further described hereinafter, these electrodes in the actually constructed embodiment were formed by a single electrode having an arcuate length of 360° deposited on the rear interior surface of the housing 11. Alternatively electrodes 13 and 15 could be formed by a single arcuate electrode or approximately 300° in length. The electrodes 13, 15 and 17 are shown as three separate electrodes in a simplified schematic representation to assist in visualizing the left, right and auxiliary conductance cells which will be more fully described below.

Figure 7:
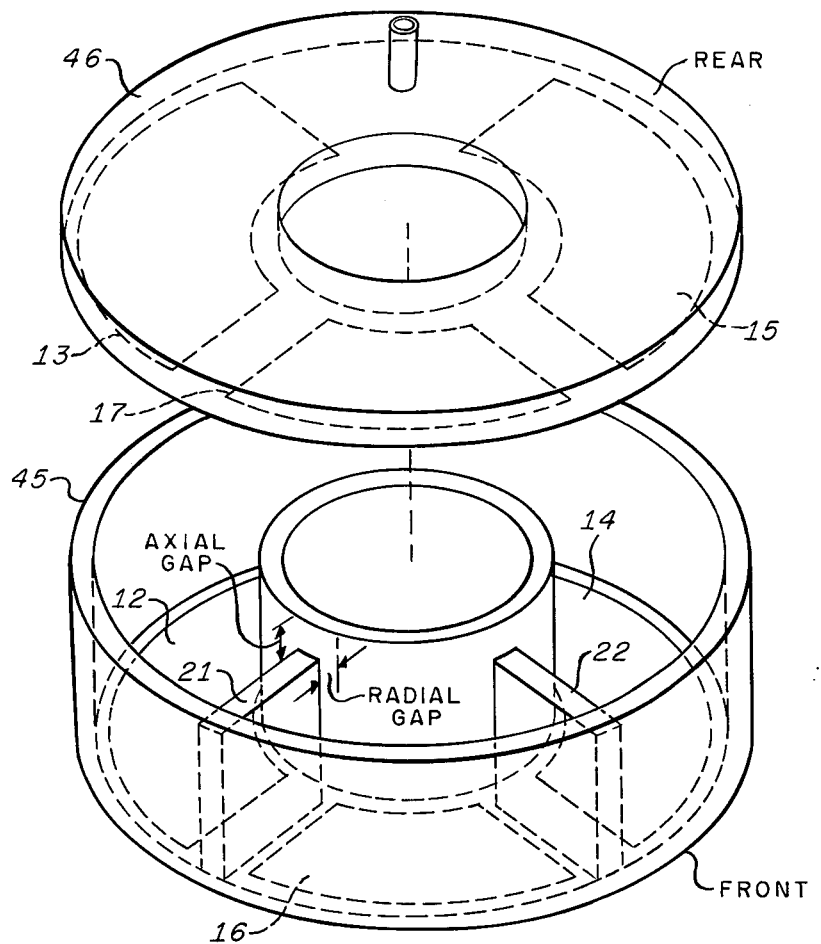
FIG. 7 is a diagram of a toroidal accelerometer incorporating the invention in which the housing includes a channel member and a flat cover plate.

Positioned between the auxiliary electrodes 16, 17 and the adjacent lower extemities of the arcuately shaped electrodes 12, 14 and 13, 15 respectively are beffles 21, 22 which are bonded to the interior surfaces of the housing 11 by a suitable adhesive such as Pyroceram "89". The baffles 21 and 22 are omitted from FIGS. 2 and 4 to provide a clearer presentation of the electrodes 12–17 and the fluid 20 but are shown in FIG. 7 and in greater detail in FIG. 8. The baffles are also made from a suitable non-conductive material and in the actual embodiment referred to above they were manufactured from the same material as the housing 11, i.e., Mycalex 620BB. The baffles 21, 22 electrically isolate the auxiliary electrodes 16, 17 from the lower extremities of the adjacent electrodes 12, 14 and 13, 15 respectively.

In addition, the baffles also provide a damping function for the fluid 20 within the toroidal accelerometer during periods of rapid angular displacements about the axis A—A. In order for the fluid 20 to flow past the baffle, gaps as shown in FIG. 7 may be provided in an axial direction between the cover of the housing 11 and the top of the baffles 21, 22 or gaps may be provided in a radial direction between the end of the baffles 21, 22 and the inner surface of the housing 11 along the axis A—A. Although both radial and axial gaps are illustrated in FIG. 7, preferably only one or the other is used in an actual embodiment of the invention.

Figure 8:
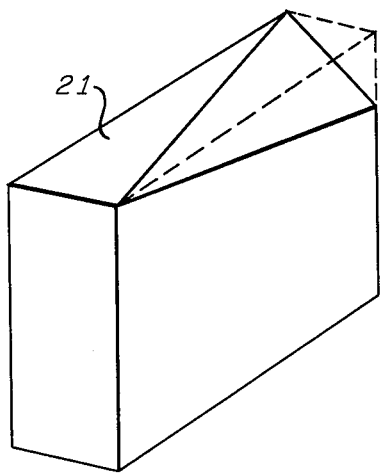
FIG. 8 is a detail drawing of a beveled baffle which may be used in the accelerometer shown in FIG. 7.

Furthermore, each baffle may be beveled to form knife edges which prevent bubbles from being entrapped in normal operating positions due to the surface tension of the electrolytic fluid 20. FIG. 8 is a detailed illustration of a baffle, such as the baffle 21 in which one corner had been beveled. The corner before being beveled is shown in phantom for purposes of comparison. In an actual embodiment of the invention the adjacent corners of the baffles 21, 22 proximte the axis A—A were beveled to eliminate bubble entrapment for clockwise and counter clockwise displacement of the accelerometer 10.

Figure 9C:
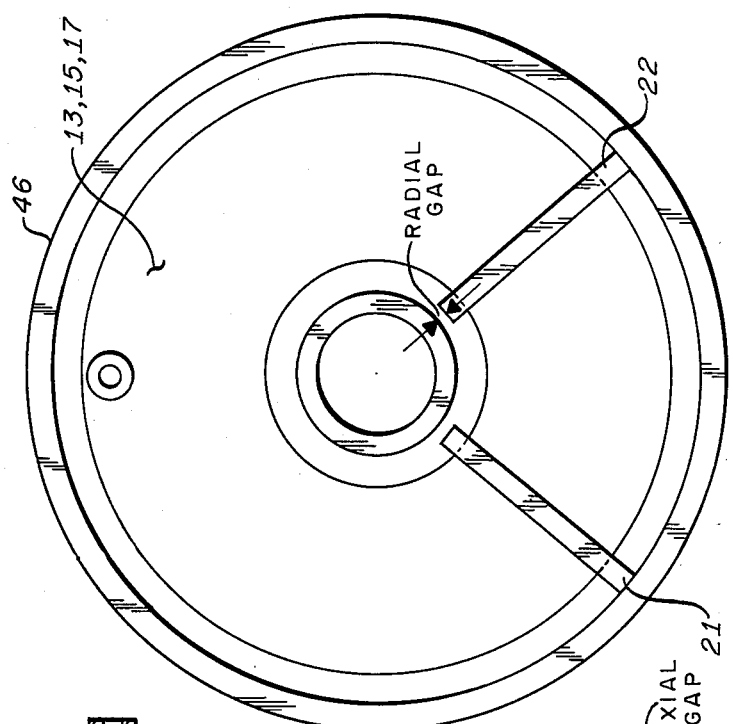
FIGS. 9a and 9c are respective left and right elevation sections of an electrical tilt sensor incorporating the invention in which the housing includes front and rear channel members.
Figure 9B:
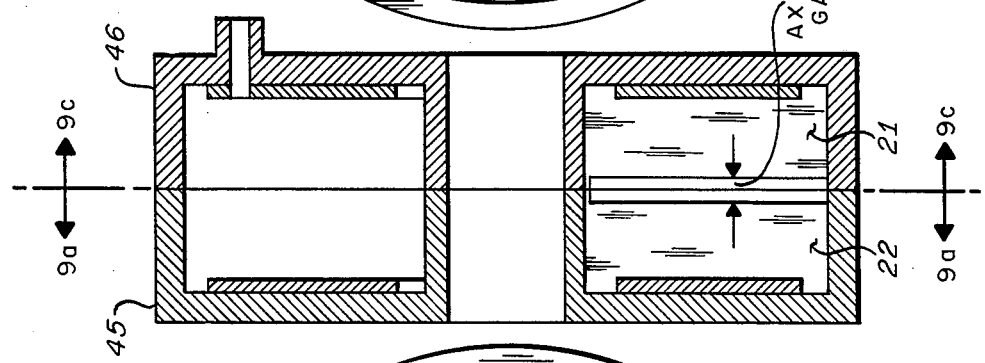
FIG. 9b is a diagram of the composite housing including the two channel members of FIGS. 9a and 9c.
Figure 9A:
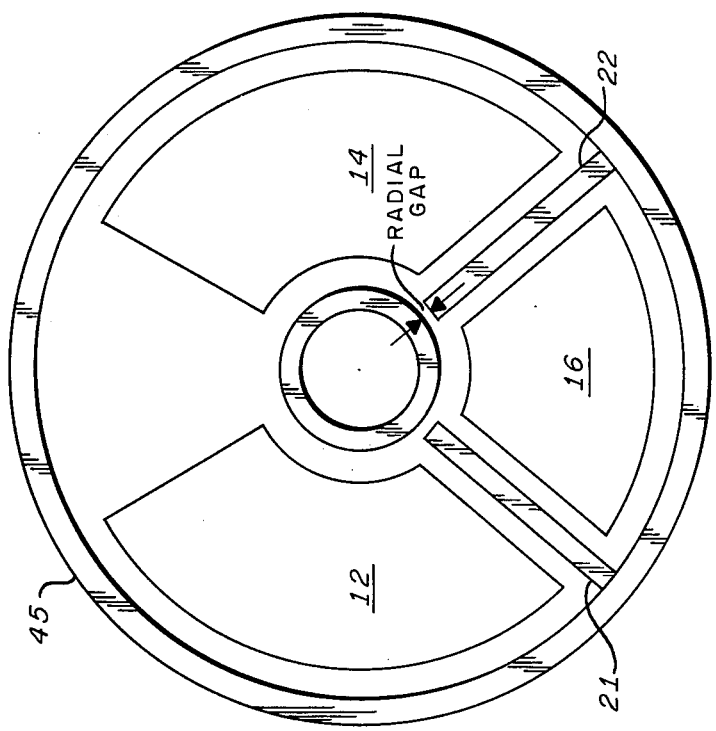

FIG. 7 is a structural diagram of the toroidal accelerometer 10 in which the housing 11 is comprised of a channel section 45 and a substantially flat cover plate 46 in which the conductive electrodes 13, 15 and 17 are affixed to the undersurface of the cover plate 46 and the electrodes 12, 14 and 16 are affixed to the interior lower surface of the channel 45. Alternately as shown in FIGS. 9a, 9b, and 9c the substantially flat cover plate 46 could be an identical channel to the channel 45 and the three separate conductive electrodes may be a single common electrode having an arcuate length of 360°. This latter configuration does not require masking the spaces between the electrodes 13, 17 and 15, 17 prior to deposition of the conductive material during the manufacture.

FIG. 3 is a schematic diagram of a prior art device in which the impedance of the electrodes 12, 13 and the electrolytic fluid therebetween is represented by the resistor $R_L$ and the impedance of the electrodes 14, 15 and the fluid 20 therebetween is represented by the resistor $R_R$. As further shown in FIG. 3, a source of alternating current 25 is coupled to terminals 26 and 27 on the primary winding 28 of a transformer 30 which has its secondary winding 31 coupled to the toroidal accelerometer 10. A first terminal 32 on the secondary winding is coupled to a first terminal on a resistor 33 which is designated $R_L$, the equivalent impedance of the left conductance cell. The second terminal 34 on the secondary winding 31 is a center tap which is connected to ground and the third terminal 35 on the secondary coil 31 is coupled to a first terminal on a resistor 36 which is designated $R_R$, the equivalent impedance of the right conductance cell. Second terminals on the resistors 33 and 36 are connected together and coupled to the negative input terminal on an operational amplifier 40 which has its output terminal connected to the first terminal on a fixed value resistor 41. The second terminal on the resistor 41 is connected to the common junction of the second terminals on the resistors 33 and 36. The positive input terminal on the operational amplifier 40 is coupled to ground.

As is well known in the prior art, the combination shown in FIG. 3 of the center tap secondary winding and the resistors 33 and 36 function as a bridge circuit in which a null output voltage is obtained between the common terminal of the resistors 33, 36 and the center tap of the secondary winding. When there is a change in the impedance value of either or both of the resistors 33, 36 a measurable output voltage is produced between the common terminal and the center tap of the secondary winding. The measurable output voltage is proportional to the change in the values of the resistors 33, 36.

Since the resistors 33, 36 represent the equivalent impedances $R_L$ and $R_R$, any change in the impedance of these respective conductance cells due to angular displacement of the housing 11 about the tilt axis A—A will produce a change in the measurable voltage signal between the common terminal and the center tap to ground. Furthermore, the direction of the angular displacement of the toroidal accelerometer 10 may be determined from the polarity of the measurable voltage signal present at the negative terminal on the operational aplifier 40. The polarity of the voltage produced across the terminals of the secondary winding 31 is represented at the terminals 32, 35 by the designations +E and −E. Therefore, if the equivalent impedance $R_L$ increases and the equivalent impedance $R_R$ decreases, the measurable voltage signal applied to the operational amplifier 40 will have a negative polarity and vice versa.

Figure 4:
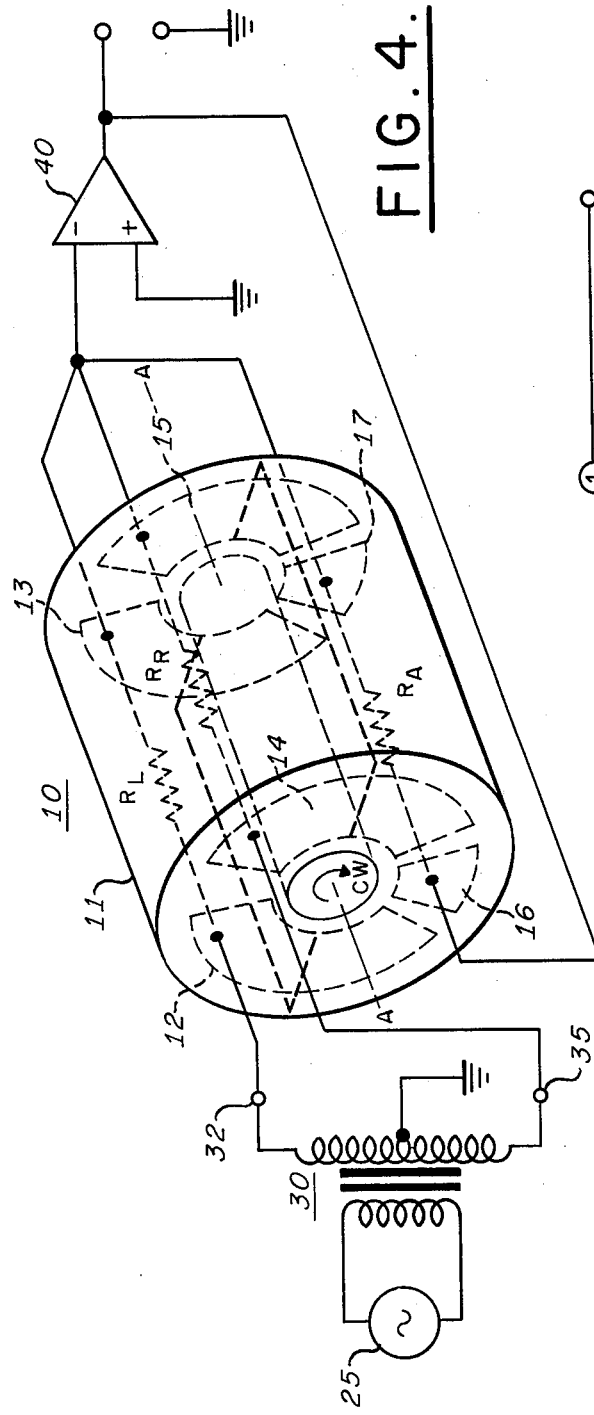
FIG. 4 is a schematic diagram of the circuit of FIG. 3 connected to the electrodes of the toroidal accelerometer.

As mentioned above in the discussion of the prior art with respect to FIG. 3, the resistor 41 was a fixed value load resistor appearing as a constant in the coefficient of tilt angle ($\theta$) in equation (13). The electrolyte resistivity ($\delta$) remains as a term in the coefficient resulting in temperature sensitivity. However, in the improved embodiment the fixed value of the load resistor 41 is replaced by the equivalent impedance of the auxiliary conductance cell designated $R_A$ as shown in FIG. 4. Thus any change in the resistivity of the electrolytic fluid 20 will produce a variation in the equivalent impedance of the auxiliary conductance cell and will be compensated for at the input of the operational amplifier 40 through the feedback variable impedance $R_A$.

FIG. 4 is a representation of the schematic diagram of the electronic circuit shown in FIG. 3 coupled to the isometric presentation of the improved toroidal accelerometer shown in FIG. 2 with the fixed value resistor 41 in FIG. 3 replaced by the variable impedance $R_A$. As previously noted, the baffles 21 and 22 are omitted from the drawing of the toroidal accelerometer for simplification of presentation. In FIG. 4 the designated impedances $R_L$, $R_R$ and $R_A$ are shown in phantom as equivalent impedances which represent the impedances of the actual circuit components within the respective conductance cells in the toroidal accelerometer. It should be noted in the representation in FIG. 4 that the electrodes 13, 15 and 17 affixed to the rear surface within the housing 11 comprise a common electrode due to the junction between each of these electrodes and the negative input terminal on the operational aplifier 40. Thus it will be readily appreciated that the basic configuration of the improved toroidal accelerometer requires at least four different electrodes, i.e., a left arcuate shaped electrode, a right arcuate shaped electrode, a common electrode and an auxiliary electrode disposed between the left and right arcuate shaped electrodes.

The detailed operation of the improved toroidal accelerometer will be explained with respect to FIG. 4 in which the source of a.c. potential 25 is coupled to transformer 30 for producing a positive output voltage at terminal 32 and a negative output voltage at terminal 35 of its secondary winding which is center tapped to ground. The terminal 32 is coupled to the first arcuately shaped electrode 12 and the second terminal 35 is coupled to the second arcuately shaped electrode 14. The output terminal of the operational amplifier 40 is coupled to the auxiliary electrode 16. When the housing 11 is positioned with respect to the A—A axis so that equal areas of the electrodes 12 and 14 are immersed in the electrolytic fluid 20, then a null measurable output voltage is applied to the negative input terminal on the operational amplifier 40. In response to a clockwise rotation of the housing 11 about the A—A axis the area of the electrodes 12, 13 immersed in the electrolytic fluid are decreased and the area of the electrodes 14, 15 immersed in the electrolytic fluid are increased. As a result the equivalent impedance represented by the resistor $R_R$ is increased and the measurable voltage signal at the common junction coupled into the negative input terminal of the operational amplifier 40 increases to a positive value proportional to the change in the immersed areas of the electrodes 12, 13 and 14, 15.

In a similar manner, if the housing 11 is angularly displaced in a counter clockwise direction about the axis A—A from a null position, the area of the electrode 14 immersed in the electrolytic fluid 20 will be decreased and the area of the conductive electrode 12 immersed in the electrolytic fluid 20 will be increased. As a result, the measurable voltage signal present at the common junction coupled to the negative input terminal of the operational amplifier 40 will be increased to a negative value. The magnitude of the negative voltage will be proportional to the change in the areas of the conductive electrodes 12, 13 and 14, 15 immersed in the electrolytic fluid 20.

The electrodes 16 and 17 will remain totally immersed in the electrolytic fluid 20 over the allowable angular range of tilt through which the housing 11 may be displaced about the horizontal axis A—A. Therefore, if there is a change in temperature which produces a variation in the resistivity ($\delta$) of the electrolytic fluid 20, this will be the only variation in the equivalent impedance $R_A$ which represents the auxiliary conductance cell. Since any variation in the impedance of the auxiliary conductance cell will also effect the variation in the equivalent impedances $R_L$ and $R_R$, the effect produced in the measurable voltage signal applied at the negative input terminal of the operational amplifier 40 wil be compensated by the signal coupled from the output of the operational amplifier 40 through the auxiliary conductance cell to the negative input terminal because the resultant output voltage coupled back to the negative input terminal will cancel the effect of temperature variations in the conductance cells represented by the equivalent impedances $R_L$ and $R_R$.

Figure 5:
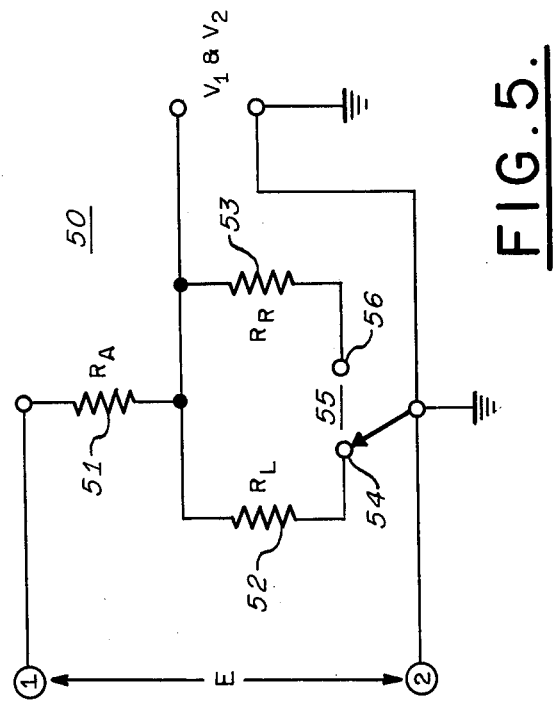
FIG. 5 is a schematic diagram of a modified electronic circuit adapted to be coupled with the electrodes of the toroidal accelerometer.

The configuration presented in FIG. 4 employs an electronic circuit which provides a single and continuous output voltage that is linearly proportional to tilt angle. An alternate embodiment as shown in FIG. 5 illustrates a second electronic circuit in which multi-state operation provides two output voltages which are measured in a switching sequence. A simple algebraic function of the measured voltages is linearly proportional to tilt angle. The computation of the tilt angle may be accomplished manually or with a simple computing circuit. As shown in FIG. 5 a voltage E is applied across the input terminals 1 and 2 of the circuit 50. A resistor 51 is representative of the variable impedance $R_A$ of the auxiliary conductance cell, the first terminal of which is connected to one terminal of the voltage source. The second terminal of the resistor 51 is connected to a common junction of the resistors 52 and 53. Resistor 52 is designated $R_L$ and represents the left conductance cell while the resistor 53 is designated $R_R$ and designates the right conductance cell. The second terminal on the resistor 52 is coupled to a first terminal 54 on a switch 55 which is shown in a normally closed position. The normally open terminal 56 on the switch 55 is connected to the second terminal on the resistor 53. The common terminal on the switch 55 is connected to the second terminal on the voltage source E and the second output terminal. The first output terminal is connected to the common junction of the resistors 51, 52 and 53.

The switch 55 is employed to energize the circuit 50 in one of two states and two output voltages $V_1$ and $V_2$ are measured. The voltage and resistance relationships in the circuit shown in FIG. 5 are as follows:

$$V_1 = ER_L/(R_L + R_A) \quad (19)$$

$$V_2 = ER_R/(R_R + R_A) \quad (20)$$

From the foregoing equations the resistance ratios for each equation is as follows:

$$R_A/R_L = E/V_1 - 1 \quad (21)$$

$$R_A/R_R = E/V_2 - 1 \quad (22)$$

Subtracting equation 21 from equation 22 yields the following function of voltage in terms of resistance for the alternate embodiment of FIG. 5:

$$(E/V_1 - E/V_2) = (R_A/R_L - R_A/R_R) \quad (23)$$

Transposing expressions and factoring out $R_A$ produces the following equation:

$$(1/R_L - 1/R_R) R_A = (E/V_1 - E/V_2) \quad (24)$$

Combining this equation with the equivalent equation (17) produces the following relationship:

$$(E/V_1 - E/V_2) = K\theta \quad (25)$$

Wherein:
$V_1$ = output voltage with switch 55 in position 54.
$V_2$ = output voltage with switch 55 in position 56.
$E$ = excitation voltage.
$K$ = construction geometry constant.
$\theta$ = tilt angle.

Thus from the foregoing mathematical derivation it can be appreciated that the output voltages $V_1$ and $V_2$ may be combined with the known value of excitation voltage E and a constant K determined by construction geometry to obtain a resultant signal which is proportional to the angle of tilt $\theta$ resulting from displacement of the toroidal accelerometer about the horizontal axis A—A.

Figure 6:
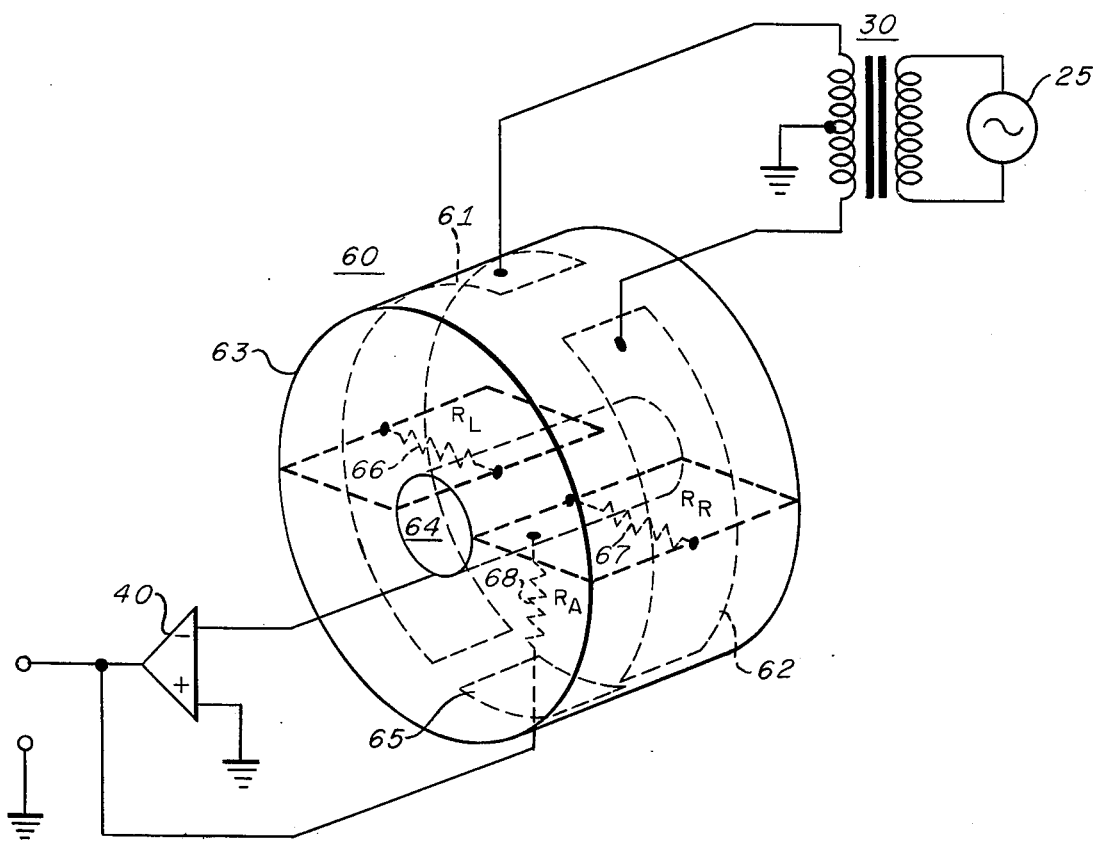
FIG. 6 is a further embodiment of a toroidal accelerometer incorporating the teachings of the present invention.

The toroidal accelerometer 60 shown in FIG. 6 is an alternate embodiment incorporating the invention in which electrodes 61 and 62 are arcuately shaped electrodes oppositely disposed within a housing 63 and affixed to the interior surface of the outer circumference of the housing 63 while the third common electrode is affixed to the interior surface of the inner circumference of the housing 63. The fourth electrode 65 is positioned between the lower extremities of the electrodes 61 and 62 and is also affixed to the interior surface of the outer circumference of the housing 63.

The resistors 66, 67 and 68 represent the variable impedances of the left conductance cell designated $R_L$, the right conductance cell, $R_R$, and the auxiliary conductance cell, $R_A$, respectively. These impedances $R_L$, $R_R$ and $R_A$ are shown in phantom in a manner identical to that as shown in FIG. 4 since these impedances are equivalent impedances which represent the impedances of the actual circuit components within the respective conductance cells in the toroidal accelerometer. The a.c. source 25, transformer 30 and operational amplifier 40 are identical to those corresponding components shown in FIG. 4. The operation of the toroidal sensor 60 in combination with the associated electronic components is identical to that described above with respect to FIG. 4. The only difference in components is the specific configuration and mounting locations of the conductive electrodes within the housing 63 as illustrated in FIG. 6.

While the invention has been described in its preferred embodiments, it is to be understood that the words which have been used are words of description rather than limitation and that changes may be made within the purview of the appended claims without departing from the true scope and spirit of the invention in its broader aspects.

We claim:
1. An electrical tilt sensor of the liquid level type having a normal tilt range comprising
non-conductive housing means defining a closed chamber of generally annular, symmetrical internal configuration about a reference axis corresponding to the horizontal axis of the sensor,
first and second electrode means fixed in said housing means and oppositely disposed with respect to each other about said axis,
third electrode means fixed between said first and second electrodes within said housing means,
fourth electrode means fixed in said housing means having corresponding portions equidistant from said first, second and third electrode means respectively,
electrolytic fluid means having volumetric and impedance characteristics which vary with ambient temperature, partially filling said chamber, partially immersing said first, second and said corresponding portions of said fourth electrode means, and completely immersing said third electrode means and said corresponding portion of said fourth electrode means for the normal tilt range of the sensor, and
circuit means coupled to said first, second, third and fourth electrode means respectively for providing an output signal proportional to the tilt of said sensor about said reference axis in accordance with the relationship:

$$\Theta = R_A \left( \frac{1}{R_L} - \frac{1}{R_R} \right)$$

$\theta$ is the tilt angle,
$R_L$ is the electrolyte resistance between said first and fourth electrode means,
$R_R$ is the electrolyte resistance between said second and fourth electrode means, and
$R_A$ is the electrolyte resistance between said third and fourth electrode means,
whereby said output signal is compensated for variations in volume and impedance of said electrolytic fluid means produced by changes in temperature.

2. An electrical tilt sensor as recited in claim 1 in which said first and second electrode means in combination with said corresponding portions of said fourth electrode means comprise first and second pairs of electrodes symmetrically opposed with respect to each other and with respect to said reference axis whereby to constitute left and right hand opposed electrode pairs, and
said electrolytic fluid means fills said chamber to the approximte level of said tilt axis with the liquid level normally bisecting each pair of said right and left electrode pairs.

3. An electrical tilt sensor of the liquid level type as recited in claim 1 in which
said first and second electrode means includes first and second arcuately shaped electrodes affixed to the interior surface of said housing means,
said third electrode means includes an arcuately-shaped electrode affixed to the interior surface of said housing means positioned between the lower extremities of said first and second electrodes, and
said fourth electrode means includes annularly-shaped electrode means affixed to the interior surface of said housing concentric with said reference axis.

4. An electrical tilt sensor of the liquid level type as recited in claim 3 in which said closed chamber of generally annular configuration further includes baffle means formed of non-conductive material disposed between said first and third arcuately shaped electrodes and between said second and third arcuately shaped electrodes for electrically isolating each of said first, second and third electrodes.

5. An electrical tilt sensor of the liquid level type as recited in claim 4 wherein said baffle means includes two rectangularly shaped blocks in which one dimension of said blocks is shorter than the corresponding internal dimension of the closed chamber of generally annular configuration thereby allowing said electrolytic fluid means to flow past said baffle means during angular displacement of said housing about said horizontal axis.

6. An electrical tilt sensor of the liquid level type as recited in claim 5 in which said baffle means includes a rectangular shaped block in which one corner is beveled to provide a knife edge that eliminates bubble entrapment in said electrolytic fluid means during angular displacement of said housing means about said horizontal axis.

7. An electrical tilt sensor of the liquid level type as recited in claim 1 in which said circuit means includes an operational amplifier having its negative input terminal coupled to said fourth electrode means and its output terminal coupled to said third electrode means for providing a feedback impedance responsive to temperature variations.

8. An electrical tilt sensor of the liquid level type as recited in claim 1 in which said circuit means includes
a source of alternating current voltage,
a transformer having its primary windings coupled to said source of alternating current voltage and a center tapped secondary winding in which its output terminals are coupled to said first and second electrode means respectively, and
an operational amplifier having its negative input terminal coupled to said fourth electrode means and its output terminal coupled to said third electrode means.

9. An electrical tilt sensor of the liquid level type as recited in claim 1 in which said circuit means includes a source of potential having a first terminal coupled to said third electrode means,
switch means having a common element coupled to a second terminal on said source of electrical potential, and a first terminal coupled to said first electrode means, and
output means coupled between said common element of said switch means and said fourth electrode means whereby said electronic circuit means provides output voltages which may be combined into a single electrical output signal proportional to the angle of displacement of said housing about said horizontal axis and is temperature compensated in accordance with the variation in impedance of said electrolytic fluid means.

10. An electrical tilt sensor of the liquid level type as recited in claim 1 in which said non-conductive housing defining a closed chamber of generally annular configuration comprises
a first chamber having a first channel therein in which said first, second and third electrode means are affixed to the bottom of said first channel, and
a second chamber having a second channel therein identical to said first chamber which includes a fourth electrode means affixed to the bottom of said second channel having an arcuate length of 360°.

11. An electrical tilt sensor of the liquid level type as recited in claim 1 in which said non-conductive housing comprises a toroidal shaped housing having first, second and third arcuately shaped electrode means affixed to the front interior surface of said housing and a fourth arcuately shaped electrode means affixed to the interior surface of the rear of said housing.

12. An electrical tilt sensor of the liquid level type as recited in claim 1 in which said non-conductive housing comprises a toroidal shaped housing having first, second and third arcuately shaped electrodes affixed to the interior perimetrical surface at the outer diameter of said toroidal shaped housing and a fourth arcuately shaped electrode means affixed to the interior perimetrical surface at the interior diameter of said toroidal shaped housing.

13. An electrical tilt sensor of the liquid level type as recited in claim 1 in which said first and second electrode means includes first and second arcuately shaped electrodes affixed to the front interior surface of said housing means, said third electrode means includes an arcuately shaped electrode affixed to the front interior surface of said housing means positioned between the lower extremities of said first and second electrodes, and said fourth electrode means includes three arcuately shaped electrodes affixed to the rear interior surface of said housing means positioned opposite said first, second and third electrode means respectively, whereby said first, second, third and fourth electrode means comprise three pairs of electrodes in which the three electrodes of the fourth electrode means are connected together external of said housing at a single junction to form a common electrode.

* * * * *